United States Patent
Väisänen et al.

(10) Patent No.: US 7,333,460 B2
(45) Date of Patent: Feb. 19, 2008

(54) ADAPTIVE BEACON INTERVAL IN WLAN

(75) Inventors: Ari Väisänen, Ruutana (FI); Pekka Orava, Tampere (FI); Henry Haverinen, Tampere (FI)

(73) Assignee: Nokia Corporation, Espoo (FI)

( * ) Notice: Subject to any disclaimer, the term of this patent is extended or adjusted under 35 U.S.C. 154(b) by 737 days.

(21) Appl. No.: 10/400,233

(22) Filed: Mar. 25, 2003

(65) Prior Publication Data

US 2004/0192284 A1    Sep. 30, 2004

(51) Int. Cl.
 *H04Q 7/24* (2006.01)
(52) U.S. Cl. .................. 370/338; 370/230; 455/343.3; 709/225; 709/229; 709/230; 709/236
(58) Field of Classification Search ................ 370/338, 370/230; 455/343.3; 709/225, 229, 230, 709/236
See application file for complete search history.

(56) References Cited

U.S. PATENT DOCUMENTS 6,192,230 B1 * 2/2001 van Bokhorst et al. .. 455/343.3
2002/0013129 A1 * 1/2002 Davies ........................ 455/41
2003/0163579 A1 * 8/2003 Knauerhase et al. ........ 709/230

OTHER PUBLICATIONS

Part 11: Wireless LAN Medium Access Control (MAC) and Physical Layer (PHY) Specifications, ANSI/IEEE Std 802.11, 1999 Edition.

* cited by examiner

*Primary Examiner*—Quynh H. Nguyen

(57) ABSTRACT

The present invention relates to Wireless Local Area Networks and Access Points in such networks, in particular it relates to the control and use of varying beacon intervals in such networks. According to the present invention, the beacon frames in the Wireless Local Area Network are provided with an adaptive beacon interval. The interval is adapted in dependence on a current network load such that the length of the beacon interval is decreased when the network load is decreased and increased when network load is increased. The invention is applicable in existing as well as future IEEE 802.11 standards.

22 Claims, 4 Drawing Sheets

ADAPTIVE BEACON INTERVAL IN WLAN

TECHNICAL FIELD

The present invention relates to Wireless Local Area Networks and Access Points in such networks, in particular it relates to the control and use of varying beacon intervals in such networks.

BACKGROUND OF THE INVENTION

Wireless Local Area Networks(WLAN) can be used to replace wired Local Area Networks or as extensions to wired LAN infrastructures and are standardized for example in accordance with the IEEE 802.11 standards.

In a Wireless Local Area Network, beacon frames are used for enabling WLAN terminals to establish and maintain communications in an orderly fashion. The beacon frames are transmitted by the Access Points(AP) at regular intervals and include a frame header and a body with various information, i.a. a Service Set Identifier(SSID) identifying the name of a specific WLAN and a beacon interval specifying the time interval between two beacon transmissions. The beacon interval is a static, configurable parameter in an Access Point.

One important purpose of the beacon frames is to inform the WLAN terminals about the presence of an Access Point in the area and to generate traffic so that the WLAN terminals can measure the Received Signal Strength Indicator(RSSI). Typically, the Beacon frames provide the WLAN terminals with information in support for their decisions to perform handovers between different WLAN Access Points.

When a WLAN terminal is scanning for other Access Points in the area, it stops sending and receiving traffic, as changing the operating channel and waiting for beacon frames to be transmitted by the Access Points has to take place. As Access Points are not synchronized with each other, the beginnings of the beacon frames are not synchronized. In worst case, a WLAN terminal has to remain on a channel for the entire duration of a beacon interval, thereby consuming battery power and reducing throughput, in order to receive the beacon frame. Scanning can be done in a number of ways to reduce latency and to reduce unavoidable drop in throughput of wanted traffic. At least passive scan, active scan and hidden scan scanning modes exist.

A drawback of active scanning is that WLAN terminal generates traffic by transmitting special requests to nearby Access Points. If there are large number of active WLAN terminals with active scanning capability, the throughput available for useful user payload data is decreased. The scanning data available from active scanning is unicast, therefore applicable only to initiating WLAN terminal, whereas beacon frames that are used in passive scanning are usable for all terminals within the coverage area.

Today beacon frames also contain a load information that informs WLAN terminals currently connected to a specific Access Point or considering making a handover to that Access Point about the load situation. This information helps the WLAN terminals in making correct handover decision, in addition to the information from the comparisons of RSSI readings obtained by scanning, and thus ensures that WLAN traffic is divided more evenly between all Access Points in the area.

As mentioned above, the beacon interval is a fixed, configurable parameter. Typically, the beacon interval setting is not touched at all in the WLAN network installation phase, but the default value selected by the equipment supplier is used. If the beacon interval is long, maximum capacity in the Access Point is achieved. However, it will the take a long time for WLAN terminals to scan for Access Points in the area and to update RSSI and load information for already found Access Points. This obviously reduces terminal throughput and wastes battery. On the other hand, if the beacon interval in short, passive scanning performed by the WLAN terminals will be faster, but the overall capacity of the Access Point will be reduced.

Thus, there is a problem with that a particular fixed beacon interval in one situation will be regarded as too long, while the same beacon interval in another situation it will be too short. As shown above, both of these situations will have a negative impact on the perceived overall performance.

Moreover, with dual band WLAN Access Points and dual band WLAN terminals this problem is even more severe since the amount of channels to scan through will be higher than in the case with only single band Access Points and single band terminals.

SUMMARY OF THE INVENTION

An object of the invention is to provide a beacon interval in a Wireless Local Area Network which improves the overall combined performance of the Wireless Local Area Network and its WLAN terminals.

This object is achieved by a method for controlling transmission of beacon frames from an Access Point in a Wireless Local Area Network, an Access Point providing beacon frames in a Wireless Local Area Network and a Wireless Local Area Network including an Access Point providing beacon frames and a wireless station.

According to the present invention, the beacon frames in the Wireless Local Area Network are provided with an adaptive beacon interval. The interval is adapted in dependence on a current network load such that the length of the beacon interval is decreased when the network load is decreased and increased when network load is increased.

The adaptation function of the interval may be such that after establishing load percentage, this load percentage is directly mapped to a suggested beacon interval using a mapping with the characteristic that the beacon interval is increased with increasing load percentage.

This is advantageous over a fixed beacon interval that has been selected during a WLAN network installation phase, since such fixed beacon interval, as discussed in the background section, in some situations will have a negative impact on the overall performance of the system with its network and terminals by being too long, and in other situations have a negative impact by being too short.

Thus, if the network load is high, the transmission frequency of the beacon frames is reduced, thereby increasing the beacon interval. This will increase the throughput in the Access Point and the capacity of the network. If the network load is low, the transmission frequency of the beacon frames is increased, thus decreasing the beacon interval. This will not negatively affect the throughput in the Access Point since the offered load does not fully load the network. Hence, an adaptive beacon interval as a function of network load minimizes the loss of overall network capacity, while enabling fact passive scanning and RSST updates by the terminals when the network is in a low load situation.

The solution according to the present invention is relevant to any future 802.11 standard in which the beacon interval of the Wireless Local Area Network is no longer fixed during operation of the network. In addition, the invention can also be used together with existing 802.11 standards.

According to an embodiment additional beacon frames are transmitted between the fixed beacon intervals with which a network was configured before it was put in operation. By varying the number of additional beacon frames between the intervals, the overall effect will be transmissions of beacon frames with an adaptive interval. The additional beacon frames may be of a different frame type compared to the beacon frames defined by the existing standard.

Thus, this embodiment of the invention addresses the various existing 802.11 standards in which the beacon interval should be fixed. The embodiment modifies a network operating in accordance with these standards. The modified network will continue to transmit beacon frames at fixed intervals, thus meeting any standard with such requirement, while at the same time providing additional beacon frames between the fixed intervals. By varying the number of additional beacon frames between the fixed intervals, the combination of all beacon frames will result in a varying, adaptive beacon interval. This embodiment has the further advantage that it allows existing WLAN terminals to continue to operate in the network as if the network only provided the initially configured fixed beacon interval. Thus, there is no need to modify such terminals, while other WLAN terminals may be operated so as to benefit from the adaptive beacon interval provided by the network.

The above mentioned and further features of, and advantages with, the present invention, will be more fully understood from the following description of a number of exemplifying embodiments of the invention. As is understood, various modifications, alterations and different combinations of features coming within the spirit and scope of the invention will become apparent to those skilled in the art when studying the general teaching set forth herein and the following detailed description.

BRIEF DESCRIPTION OF THE DRAWINGS

Exemplifying embodiments of the present invention will now be described with reference to the accompanying drawings, in which.

DETAILED DESCRIPTION OF THE INVENTION

Figure 1:
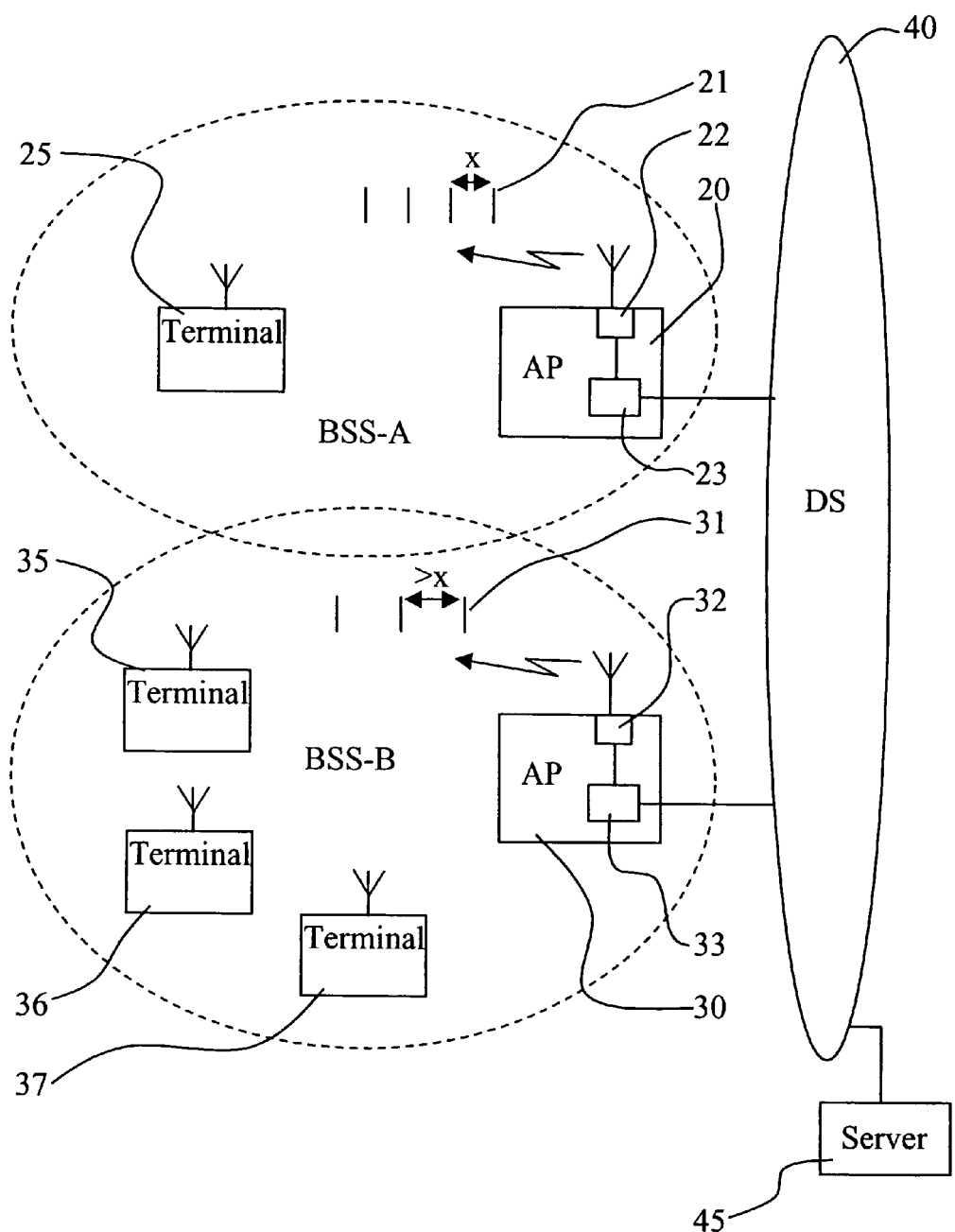
FIG. 1 shows an example of a Wireless Local Area Network in accordance with the invention.

FIG. 1 shows an exemplifying Wireless Local Area Network(WLAN) having a structure and operation in accordance with the present invention.

The WLAN in FIG. 1 includes two so-called basic Service Sets, BSS-A and BSS-B, each including an Access Point (AP) and WLAN terminals in communication with or serviced by the Access Point. BSS-A includes the Access Point 20 and the WLAN terminal 25, while BSS-B includes the Access Point 30 and the WLAN terminals 35, 36 and 37. The Access Points 20, 30 are connected to a Distribution System (DS) 40 which typically is a wired Local Area Network or some other kind of backbone network interconnecting the different Access Points of the WLAN. The DS is typically further connected to one or more servers 45 and/or further networks, e.g. the Internet or the like (not shown). The DS allows a WLAN terminal to communicate, via an Access Point, with other terminals connected to the WLAN or with servers 45 or other entities to which connection can be established over the DS and any further connected network.

The Access Points 20, 30 communicate wirelessly with the WLAN terminals within the respective BSS using respective included radio frequency transceivers 22, 32, which transceivers implement the transmitting means of the present invention. The Access Points 20, 30 further include respective processing means 23, 33 for controlling its operation and the communication with the WLAN terminals and with the Distribution System. The processing means 23, 33 are further arranged to measure the load on the respective Access Point as well as the occupancy level of the wireless medium used by the respective Access Point. Thus, these processing means 23, 33 implement the measuring means and the processing means as defined by the invention.

FIG. 1 illustrates that in BSS-B, the number of WLAN terminals 35, 36, 37 in communication with or serviced by Access Point 30 is higher than the number of WLAN terminals in BSS-A. Thus it can be assumed that the load on Access Point 30 and the occupancy level of the Wireless medium used in BSS-B therefore is higher compared to the load on Access Point 20 and the wireless medium occupancy level in DSS A.

The Access Points 20, 30 transmit beacon frames to inform the WLAN terminals about the presence of an Access Point in the area and to generate traffic so that the WLAN terminals inter alia can measure the Received Signal Strength Indicator(RSSI). A beacon frame is made up of a header, a body and a frame check sequence (FCS) field. The body include various information such as a beacon interval, a Service Set Identifier(SSID) Capability information bits, as well as other kind of information.

In FIG. 1, the vertical lines 21, 31 represents the transmission of respective beacon frames. As can be seen in FIG. 1, the length of the beacon interval currently used by Access Point 20 for transmitting beacon frames has the length "x", i.e. the length between subsequent lines 21, while the length of the beacon interval currently used by Access Point 30 is greater than "x", i.e. the length between subsequent lines 31 is greater than "x".

Hence, the figure illustrates that the Access Points 20 and 30 have adapted their respective beacon intervals in dependence on the network load, i.e. Access Point 20 has adapted the beacon interval to be shorter, as compared with Access Point 30, due to a low load in BSS-A, whereas Access Point 30 has adapted the beacon interval to be longer, as compared with Access Point 20, due to a high load in BSS-B.

The WLAN terminals in the WLAN of FIG. 1 are any kind of terminals equipped with radio frequency receivers adapted to communicate with an Access Point of a WLAN, such as a mobile phone with WLAN capabilities, a portable computer with a WLAN plug-in card and the like.

Figure 2A:
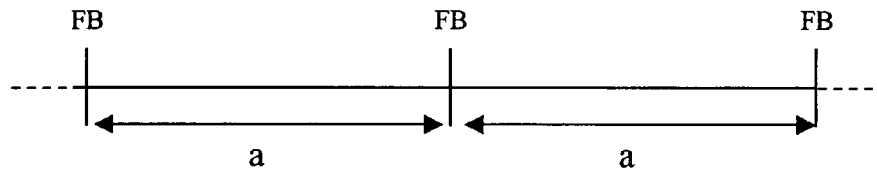
FIGS. 2a, 2b and 2c illustrate the transmissions of beacon frames with different intervals in accordance with an embodiment of the invention.
Figure 2B:
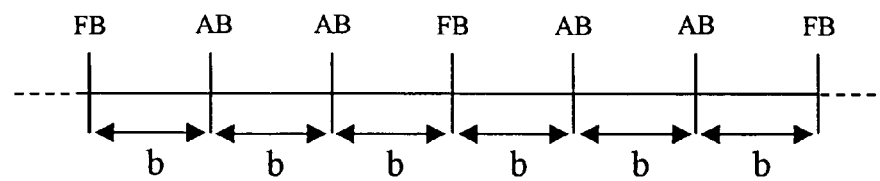
Figure 2C:
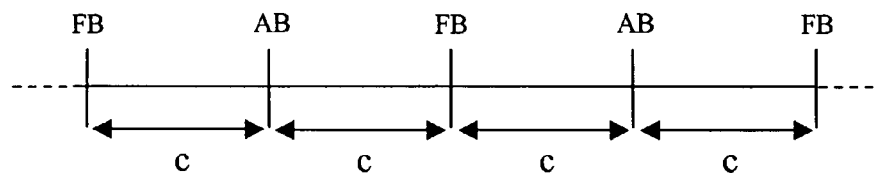

With reference to FIGS. 2a, 2b and 2c the transmissions of beacon frames with different intervals in accordance with an embodiment of the invention are shown.

FIG. 2a illustrate the transmissions of beacon frames at a fixed interval having the fixed length "a" in a WLAN, these beacon frames are denoted FB (Fixed Beacon frame). FIGS. 2b and 2c illustrate the transmissions of beacon frames in a BSS with different respective network loads. The network load measured in BSS-A of FIG. 1 being lower than the network load measured in BSS B would then result in beacon frame transmissions in BSS-A corresponding to FIG. 2b, whereas beacon frames transmissions in BSS-B would correspond to FIG. 2c.

In FIG. 2b it can be seen that the additional beacon frame transmissions, denoted AB (Additional Beacon frame) have been added within each interval of two fixed beacon frames FB. The beacon frames have been added so that the result of all transmitted beacon frames is a beacon interval "b" which is shorter than the fixed interval "a". Furthermore, the additional beacon frames have been added so that the fixed beacon interval divided with the number of subintervals formed there between is an integer value. In this way the beacon frames will be evenly distributed when forming the adapted beacon interval.

In FIG. 2c it can be seen that the number of additional beacon frame AB transmissions within each interval of two fixed beacon frames FB, as compared to FIG. 2b, have been reduced. The additional beacon frames have been reduced so that the result of all transmitted beacon frames is a beacon interval "c" which is longer than the beacon interval "b". Furthermore, the additional beacon frames have been reduced so that the fixed beacon interval divided with the number of subintervals formed there between by the additional beacon frames is an integer value. In this way the beacon frames will be evenly distributed when forming the adapted beacon interval.

Thus, it can be seen in FIGS. 2a-2c that additional beacons have been added in 2b and 2c without changing the occurrence of beacon frames coinciding with the originally configured fixed beacon interval. The information of this fixed beacon interval in the beacon interval bits of the beacon frame can therefore remain unchanged. In this way, a WLAN terminal which assumes that the beacon interval is constant during operation of the network will not, and does not need to, take any notice of the adaptive beacon interval. Such a WLAN terminal can therefore remain in the same sleep/wake cycle in accordance with the configured fixed beacon interval.

As beacon intervals normally are defined in the units of 1 TU (1 TU-1 k μs-1024 μs) in IEEE802.11 standards, the transmissions of the additional beacon frames should occur at instances that are rounded to full TUs with respect to the beacon frames that coincide with the fixed beacon intervals.

When an Access Point changes the adaptive beacon interval, i.e. increases it due to a higher network load or decreases it due to a lower network load, the new resulting beacon interval is informed to those WLAN terminals that are adapted to continuously check for a new beacon interval. The information of the new beacon interval is transmitted to the WLAN terminals in the beacon frames at a position different from the beacon interval bits designating the fixed beacon interval, e.g. by using IEEE802.11 capability to add freeform information elements to beacon frames, or in some spare bits of the beacon frame. However, this information regarding the adapted beacon interval can be provided anywhere within the beacon frame provided the WLAN terminals are configured to extract this information from the position in question. The information itself may e.g. consist of an integer value denoting an integer divider with which the fixed beacon interval has been divided into the smaller subintervals.

Figure 3:
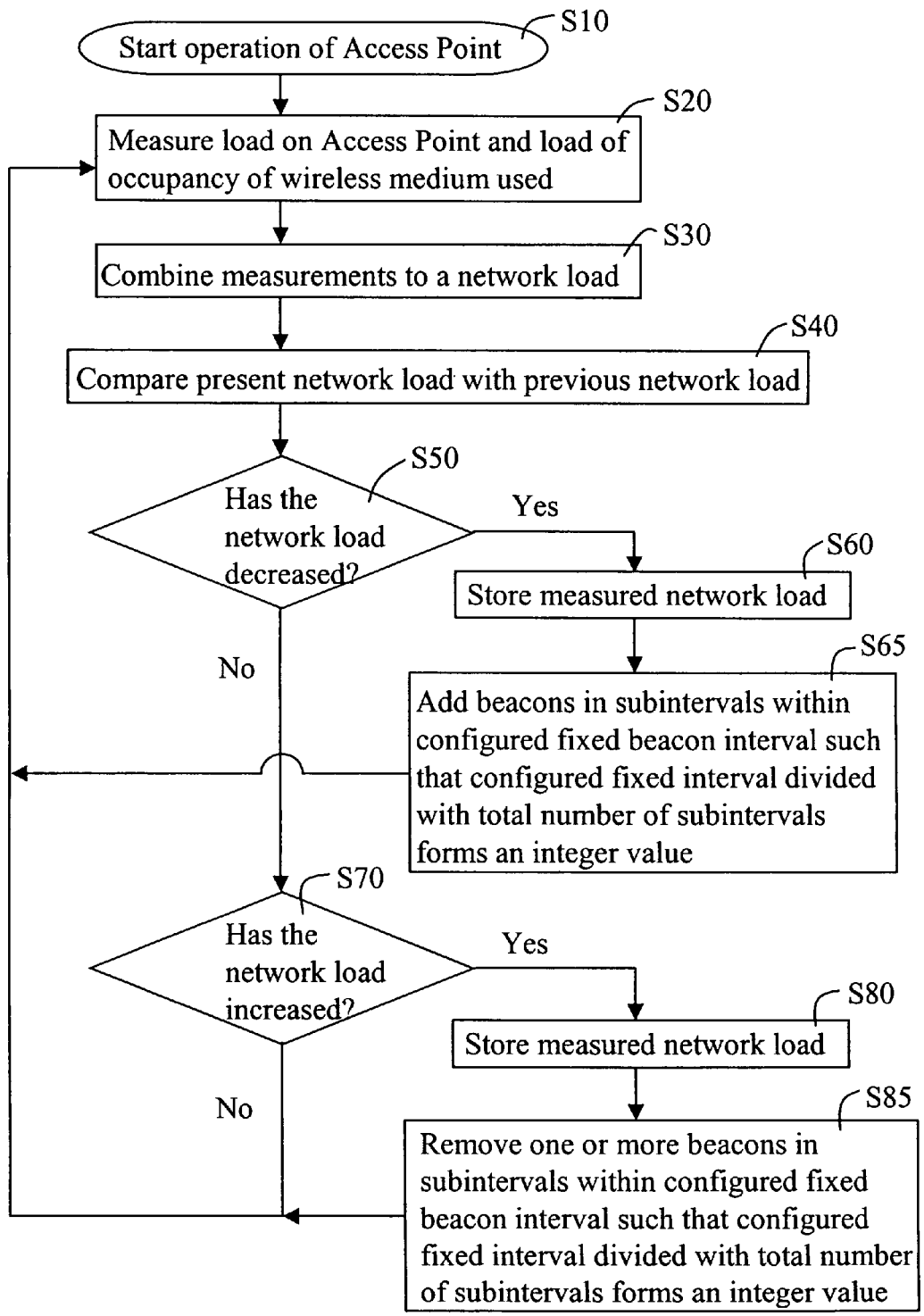
FIG. 3 shows a flow chart of the operation, of an Access Point in accordance with an embodiment of the invention.

With reference to FIG. 3 a flow chart of the operation of an Access Point in accordance with an embodiment of the invention is shown.

In step S10 the Access Point is taken into operation after having been configured. In this embodiment, this configuration includes setting up the Access Point to operate so as to transmit beacon frames at fixed intervals. In step S20, during operation, the Access Point measures the load on the Access Point and the occupancy level of the wireless medium used by the Access Point. These measurements are then combined in step S30 so as to form a measured network load. In step S40 the measured present network load is compared with a previously stored network load (during first comparison after the Access Point have been taken into operation, with a pre-configured "dummy" network load).

In step S50 it is checked if the network load as measured has decreased compared to the stored network load. If it has, operation continues with step S60, if it has not, operation continues to step S70. In step S60, the measured network load is stored for future comparison with a new measured network load. In Step S65 one or more beacon frames is/are added to form subintervals within the configured fixed beacon interval such that the configured fixed interval divided with the total number of subintervals is equal to an integer value. In this way the length of the overall beacon frame interval, i.e. the adaptive beacon frame interval, is decreased. The operation then returns to step S20.

In step S70 it is checked if the network load as measured has increased compared to the stored network load. If it has, operation continues with step S80, if it has not, operation returns to step S20. In step S80, the measured network load is stored for future comparison with a new measured network load.

In step S85 one or more beacon frames within the configured fixed beacon interval is/are removed and the remaining beacon frames transmitted so as to form subintervals within the fixed beacon interval. The number of intermediate beacon frames, and thus subintervals, are chosen so that the configured fixed interval divided with the total number of subintervals is equal to an integer value. In this way the length of the overall beacon frame interval, i.e. the adaptive beacon frame interval, is increased. The operation then returns to step S20.

It should be noted, that an alternative to decreasing the beacon interval when the load on an Access Point is low and the occupancy level of a wireless medium used by the Access Point is low, is to have the Access Point generate extra traffic, or "null" traffic, in order to facilitate passive RSSI measurements by the WLAN terminals. If the network load is high, such extra traffic is not generated by the Access Point.

Figure 4:
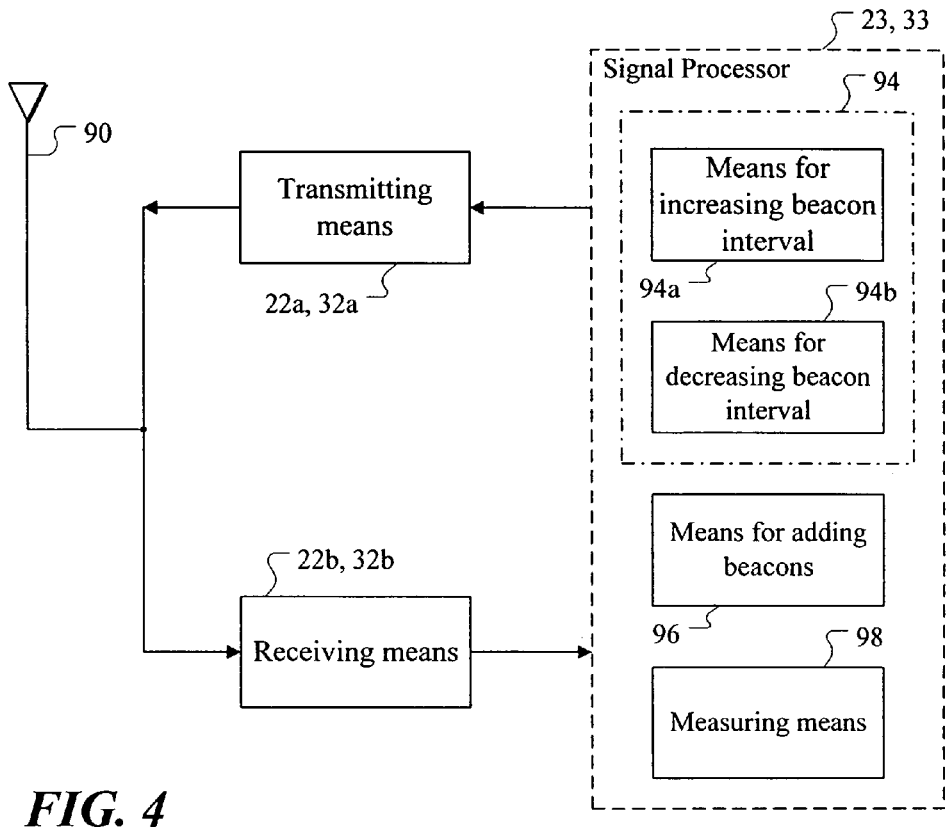
FIG. 4 shows the transceivers 22, 32 of FIG. 1 in combination with the processing means 23, 33, along with measuring means to measure the load on the respective access point as well as the occupancy level of the wireless medium used by the respective access point.

Referring now to FIG. 4, the transceivers 22, 32 of FIG. 1 are shown in more detail as comprising transmitting means 22a, 32a and receiving means 22b, 32b, connected to a common antenna 90, although they could use separate antennas. The transmitting means and receiving means are shown connected to a signal processor 92, which includes means 94 for increasing or decreasing beacon intervals, means 96 for adding beacons, and measuring means 98. The means 94 may include separate means 94a for increasing the beacon interval and separate means 94b for decreasing the beacon interval. The signal processor 23, 33 of FIG. 4 is shown having functional blocks 94a, 94b, 96, 98 in order to represent the functions discussed above in connection with the access points 20, 30 of FIG. 1. In other words, the access points 20, 30 of FIG. 1 provide beacon frames in a wireless local area network, and the access points each include transmitting means 22a, 32a for transmitting the beacon frames with an adaptive beacon interval that depends on the current network load during operation of the network, wherein the length of the adaptive beacon interval is decreased by the means 94b when the network load is decreased, and increased by the means for increasing the beacon interval 94a when the network load is increased. The signal processor 23, 33 includes measuring means 98 for measuring the network load as the load of the access point. Or, the measuring means can be for measuring the network load as the occupancy level of a channel used by the access point on the wireless medium. Likewise, the measuring means could be for measuring the network load as the combination of the load of the access point and the occupancy level of the wireless medium for a channel used by the access point for transmitting the beacon frames.

The signal processor 23, 33 also may have the capability of adding beacons with means 96 at subintervals between the beacons with a fixed beacon interval in order to provide an overall beacon interval that forms an adaptive beacon interval. The subinterval may be chosen such that the fixed beacon interval divided with the subinterval forms an integer value.

Figure 5:
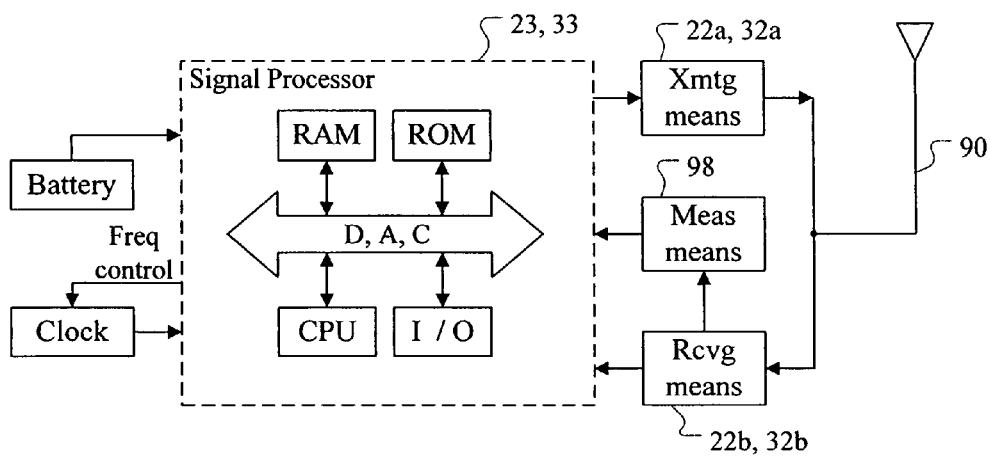
FIG. 5 is similar to FIG. 4, except that the signal processor is shown using a general purpose signal processor programmed to carry out the steps of FIG. 3.

FIG. 5 shows a general purpose signal processor used for the same purposes as described in FIG. 4 by functional blocks. The signal processor of FIG. 5 may differ slightly from that of FIG. 4 by having the measuring means 98 outside the signal processor itself as a separate entity. The general purpose signal processor has a central processing unit (CPU), a random-access memory (RAN), a read-only memory (RaM), an input/output (I/O), all connected to a data, address and control bus (D, A, C) which in turn is connected to the transceiving means 22, 32 and the measuring means 98 through the I/O. The signal processor 23, 33 may also be connected to a battery and a clock, which may have its frequency controlled by the signal processor, if desired, in order to carry out the present invention. It will be understood that the general purpose signal processor 23, 33 of FIG. 5 will have the steps of FIG. 3 encoded in a computer program stored in the ROM for execution by the CPU, with the results of intermediate steps stored in the RAM. All of this is well known in the art and need not be described in detail here.

It should further be noted that the detailed description above of different embodiments of the invention has been given by way of illustration only, and that various alterations and modifications falling within the scope of the appended claims and within the spirit and scope of the general teaching set forth herein will become apparent to those skilled in the art.

The invention claimed is:

1. A method for controlling transmission of beacon frames from an access point in a wireless local area network, comprising:
    adding additional beacons at subintervals between beacons with a fixed beacon interval in order to provide an overall beacon interval that forms an adaptive beacon interval, wherein said fixed beacon interval is fixed prior to operation of the access point,
    transmitting the beacon frames from the access point with said adaptive beacon interval in dependence on a current network load during operation of the network by
    decreasing an adaptive beacon interval length when the network load is decreased, and
    increasing said adaptive beacon interval length when the network load is increased.

2. The method as claimed in claim 1, including:
    measuring the network load as the load of the access point.

3. The method as claimed in claim 1, including:
    measuring the network load as the occupancy level of a channel used by the access point on the wireless medium.

4. The method as claimed in claim 1, including:
    measuring the network load as the combination of the load of the access point and the occupancy level of a wireless medium for a channel used by the access point for transmitting the beacon frames.

5. The method as claimed in claim 1, wherein the subinterval is chosen such that the fixed beacon interval divided with the subinterval forms an integer value.

6. The method as claimed in claim 5, including:
    measuring the network load as the load of the access point.

7. The method as claimed in claim 5, including:
    measuring the network load as the occupancy level of a channel used by the access point on the wireless medium.

8. The method as claimed in claim 5, including: measuring the network load as the combination of the load of the access point and the occupancy level of a wireless medium for a channel used by the access point for transmitting the beacon frames.

9. An access point providing beacon frames in a wireless local area network, the access point comprising:
    a signal processor for adding additional beacons at subintervals between beacons with a fixed beacon interval in order to provide an overall beacon interval that forms an adaptive beacon interval, wherein said fixed beacon interval is configured prior to operation of the access point; and
    a transmitter for transmitting the beacon frames in the wireless local area network with the adaptive beacon interval in dependence on a current network load during operation of the network,
    wherein the signal processor is configured for decreasing a length of the adaptive beacon interval when the network load is decreased and increasing the length of the adaptive beacon interval when network load is increased.

10. The access point as claimed in claim 9, further comprising:
    measuring device for measuring the network load as the load of the access point.

11. The access point as claimed in claim 9, including:
    measuring device for measuring the network load as the occupancy level of a channel used by the access point on the wireless medium.

12. The access point as claimed in claim 9, further comprising:
    measuring device for measuring the network load as the combination of the load of the access point and the occupancy level of a wireless medium for a channel used by the access point for transmitting the beacon frames.

13. The access point as claimed in claim 9, wherein the subinterval is chosen such that the fixed beacon interval divided with the subinterval forms an integer value.

14. The access point as claimed in claim 13, including:
  measuring device for measuring the network load as the load of the access point.

15. The access point as claimed in claim 13, further comprising:
  measuring device for measuring the network load as the occupancy level of a channel used by the access point on the wireless medium.

16. The access point as claimed in claim 13, further comprising:
  measuring device for measuring the network load as the combination of the load of the access point and the occupancy level of a wireless medium for a channel used by the access point for transmitting the beacon frames.

17. A wireless local area network including an access point providing beacon frames and a wireless station for receiving said beacon frames, the access point having a fixed beacon interval configured prior to its operation, the access point comprising:
  a signal processor for adding additional beacons at subintervals between the beacons with the fixed beacon interval in order to provide an overall beacon interval that forms an adaptive beacon interval; and
  a transmitter for transmitting the beacon frames from the access point with the adaptive beacon interval in dependence on a current network load during operation of the network,
  wherein the signal processor is configured for decreasing a length of the adaptive beacon interval when the network load is decreased and increasing the length of the adaptive beacon interval when network load is increased.

18. The wireless local area network as claimed in claim 17, wherein the subinterval is chosen such that the fixed beacon interval divided with the subinterval forms an integer value.

19. The wireless local area network as claimed in claim 18, wherein said access point includes:
  measuring device for measuring the network load as the load of the access point.

20. The wireless local area network as claimed in claim 18, wherein said access point comprises:
  measuring device for measuring the network load as the occupancy level of a channel used by the access point on the wireless medium.

21. The wireless local area network as claimed in claim 18, wherein said access point comprises:
  measuring device for measuring the network load as the combination of the load of the access point and the occupancy level of a wireless medium for a channel used by the access point for transmitting the beacon frames.

22. The wireless local area network as claimed in claim 17, wherein the included wireless station is a mobile phone with wireless local area network capabilities or a portable computer with a plug-in card having wireless local area network capabilities.

* * * * *